United States Patent

[11] 3,553,357

[72] Inventor Peter Swift Carnt
Herrliberg, Switzerland
[21] Appl. No. 702,400
[22] Filed Feb. 1, 1968
[45] Patented Jan. 5, 1971
[73] Assignee RCA Corporation
a corporation of Delaware
[32] Priority Feb. 2, 1967
[33] Great Britain
[31] No. 5143/67

[54] SWITCHING MODE CONTROL CIRCUITS
8 Claims, 7 Drawing Figs.

[52] U.S. Cl. ........................................ 178/5.4
[51] Int. Cl. ........................................ H04n 9/44, H04n 9/32
[50] Field of Search ........................................ 178/5.2, 5.4, 5.4P, 5.4S, 69.5TV

[56] References Cited

UNITED STATES PATENTS

| | | | |
|---|---|---|---|
| 2,828,419 | 3/1958 | Gruen | 178/69.5TV |
| 2,831,917 | 4/1958 | Jacobs, Jr. | 178/5.4P |
| 3,073,894 | 1/1963 | De France | 178/5.4P |

FOREIGN PATENTS

| | | | |
|---|---|---|---|
| 1,371,495 | 7/1964 | France | 178/5.4P |

*Primary Examiner*—Richard Murray
*Attorneys*—Eugene N. Whitacre and William H. Meagher

ABSTRACT: Identification and control circuitry for establishing the correct mode of line to line switching in a PAL color television decoder. A phase detector for APC control of the receiver's reference color oscillator develops a half line frequency square wave in an auxiliary output circuit in response to line to line burst phase alternations. Derived square wave is compared in phase with output of switch-driving flip-flop circuit in a second phase detector to develop a DC control voltage of a first value when receiver switching mode is correct, and of a second value when switching mode is incorrect. Per one disclosed control technique, a resetting field frequency trigger is passed to the flip-flop circuit when control voltage value signifies incorrect switching. Per another disclosed control technique, flip-flop circuit is disabled when control voltage value signifies incorrect switching; restart and turnoff continues until flip-flop restarts in correct mode. Application of control techniques to SECAM receiver switching is further disclosed.

INVENTOR
PETER S. CARNT
BY
William H. Meagher
ATTORNEY

INVENTOR
PETER S. CARNT
BY
William H. Meagher
ATTORNEY

INVENTOR
PETER S. CARNT
BY
William H. Meagher
ATTORNEY

SWITCHING MODE CONTROL CIRCUITS

This invention relates to control circuitry useful in establishing the correct mode of line to line switching in the decoder of PAL or SECAM type color television equipment, and involves the development of accurate, noise-immune switching mode control information in a novel and relatively inexpensive manner, and the use of such control information in such a manner as to preclude disturbance of switch operation when the correct mode is established.

In the PAL color TV system the R-Y subcarrier component is switched by 180° from line to line at the encoder. It follows that a corresponding switching must take place in the decoder in order to properly recover the R-Y component.

A conventional practice for effecting such switching in a PAL color television receiver involves switching of the reference carrier input to the receiver's R-Y demodulator, with the reference carrier switch being driven by a suitably triggered flip-flop circuit (also referred to as a binary, or as a bistable multivibrator). The switch-driving flip-flop circuit is normally triggered from the horizontal scan circuitry since this is a convenient source of horizontal frequency pulses which have good noise immunity. However, it is clear that some device is necessary to ensure that the phase of the switching operation the receiver is the same as that of the corresponding switching operation in the encoder; otherwise as intended +(R-Y) component would be reproduced as a −(R-Y) component and vice versa.

The necessary identification information is contained in the color burst, whose R-Y component is also alternating by 180° from line to line. Thus, for a line in which the burst R-Y component is positive, for example, the switching operation in the receiver must be in such a phase that a positive R-Y reference subcarrier signal is delivered to the R-Y synchronous detector.

A typical PAL receiver contains a subcarrier oscillator which is locked by the color burst, just as in an NTSC receiver. Although in the PAL system, the burst R-Y component alternates by 180° from line to line the effective Q of the locked oscillator is so high that this has no effect on the regenerated subcarrier, and the latter remains constant in phase as in NTSC practice. It follows that if the regenerated subcarrier of appropriate phase is fed to a separate synchronous detector which is also fed with the burst, an output will be obtained which consists of pulses which are alternately positive and negative from line to line. If these pulses are passed through an integrating circuit, an approximate square wave will result.

Where an APC loop is used for oscillator control, the square wave can be conveniently obtained in practice from (an auxiliary output of) the detector apparatus of the oscillator APC loop itself, without the need for a separate synchronous detector.

The square wave obtained by the above method would appear to be directly usable for switching mode control purposes: for example, to trigger the receiver'flip-flop circuit directly, instead of using pulses from the horizontal scan circuit; or as a supplementary trigger merely to ensure the correct triggering by horizontal pulses. However, neither of these methods have proved feasible in practice because of disturbances due to noise.

It is common practice, therefore, to take the square wave from the APC loop and pass it through a high Q circuit before feeding it to the flip-flop circuit as a correcting trigger. This method has the disadvantage that it is difficult to obtain a sufficiently high Q, and an expensive inductance is required. A development of this method involves the use of positive feedback to increase the Q, but it is well known that the stability of such an arrangement is poor. A further development of this method involves the use of sufficient positive feedback to give oscillation, in which case the Q is infinite. However, the problem of frequency stability has then to be considered.

From NTSC experience, it is well known that a synchronous detector type color killer has excellent noise performance. That is, it is possible to obtain a highly reliable DC voltage indication of the state of synchronism of the locked oscillator. In accordance with the principles of the present invention, this technique is applied in the case of PAL identification to obtain a reliable DC voltage indication of the state of receiver switching. That is, an additional phase detector is employed to compare the phase of the half line frequency square wave derived from received bursts with the phase of the carrier switch driving flip-flop circuit output. The DC voltage output of the additional phase detector is of one value when the carrier switch is driven in the correct mode, but of a discernible different value whenever the correct mode of switching is not being attained.

In accordance with several emobdiments in the invention, the control voltage output of the additional detector may be used to determine the conduction or nonconduction of an amplifier receiving a field frequency triggering pulse. Whenever the detector output indicates that switching is in the correct mode, the amplifier is rendered nonconductive, and normal triggering of the switch-driving flip-flop circuit is left undisturbed. However, when switching is incorrect, the detector output renders the amplifier conductive, and the field frequency is passed as an additional correcting trigger.

In accordance with another and preferred embodiment of the invention, the control voltage output of the detector is used to enable or disable the receiver's flip-flop circuit. Whenever an incorrect switching mode is sensed by the detector, the flip-flop circuit is turned off. The detector then responds to the turn off by developing an output of enabling value, whereupon the flip-flop circuit restarts. If the flip-flop circuit restarts in the correct mode, normal triggering thereof is left undisturbed. However, if the flip-flop circuit restarts in the wrong mode, the detector output once again disables the flip-flop circuit. Disabling and restart continue in sequence until restart in the correct mode is attained.

Control circuits in accordance with the above-described embodiments have the advantage of substantial noise immunity, without requiring expensive components and without introducing difficult stability problems. An important characteristic of the operation of circuits in accordance with the invention is that the receiver's flip-flop circuit, when operating correctly, is isolated from the introduction of noise via the control circuits.

The switching mode control circuits of the invention are useful not only in PAL receivers, but also in other PAL equipment where switching mode identification and control is required (e.g., tape recorders, cameras and picture monitors). The switching mode control approaches of the present invention may also be advantageously employed in conjunction with decoders in the SECAM type of color television system.

A primary object of the present invention is to provide novel and improved control circuits for establishing the correct mode of line to line switching in color television equipment of the PAL or SECAM type.

A particular object of the present invention is to provide novel and improved switching mode identification and control circuitry for a PAL receiver; wherein disturbance by noise of a correctly switching decoder is substantially precluded.

Other objects and advantages of the present invention will be recognized by those skilled in the art upon a reading of the following detailed description, and an inspection of the accompanying drawings in which.

Figure 1:
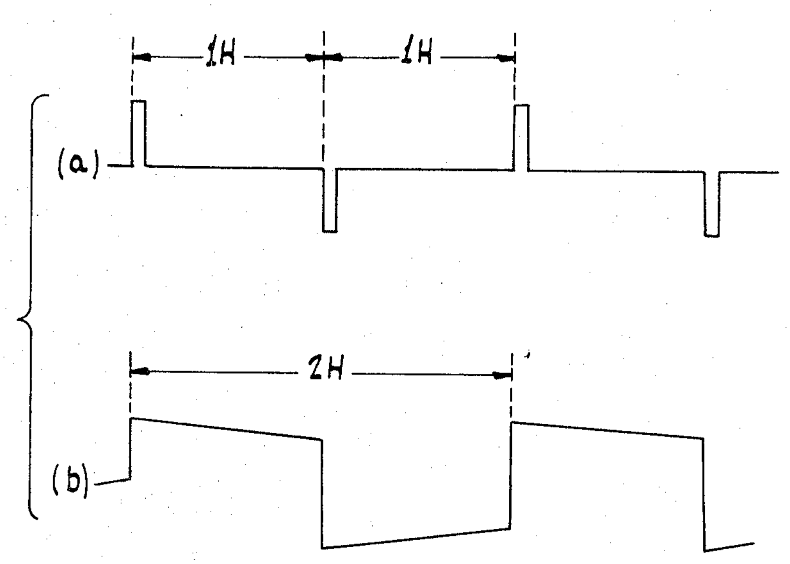
FIG. 1 illustrates graphically signal waveforms of aid in explaining the operation of the circuitry of FIG. 2.
Figure 2:
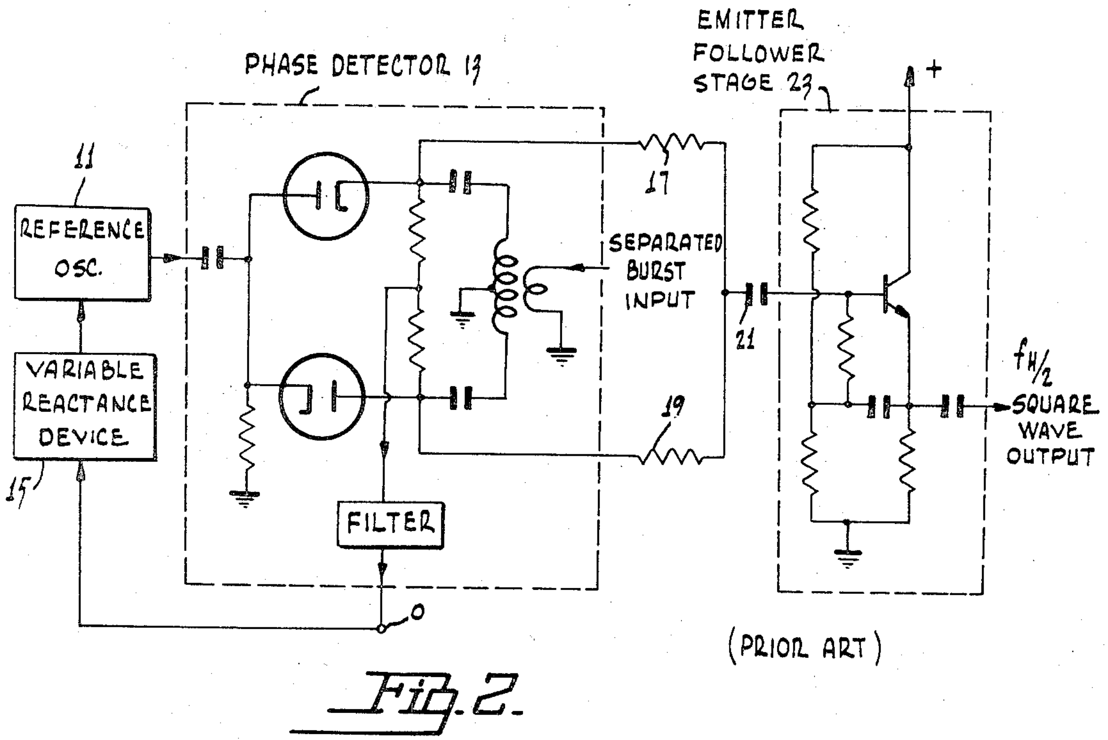
FIG. 2 illustrates, in a combined block and schematic representation, known apparatus for deriving a half line frequency identification square wave from received color bursts.

FIG. 1A illustrates graphically a train of pulses which are alternately positively and negative from line to line, while FIG. 1B illustrates the half line frequency square wave that results from an integration of the pulses of FIG. 1A. As noted previously, an output of the form of FIG. 1A may be obtained if a regenerated subcarrier of appropriate phase is derived from the receiver's synchronized reference color oscillator and fed to a phase detector which is also fed with the received "-swinging" burst. Also, as noted previously, where an APC loop is used for reference oscillator synchronization, the FIG. 1B square wave can be conveniently obtained in practice from an output circuit of suitable time constant of the detector apparatus of the oscillator APC loop itself, without the need for a separate phase detector. FIG. 2 is illustrative of known apparatus for thus developing the half line frequency square wave. In the FIG. 2 arrangement, an output of the reference color oscillator 11 of the receiver is applied to a phase detector 13 for comparison in phase with separated bursts also supplied as an input to the detector 13. With suitable filtering, a DC control voltage output is developed at output terminal O for application to a variable reactance device 15, which adjusts the cycling of oscillator 11 to obtain suitable phase synchronization of the oscillator. For proper APC loop operation, the filtering of the output terminal O will be of such efficacy as to remove the effects of the line to line alternation of phase of the bursts, with the result that the oscillator is effectively locked with respect to an average burst phase.

For production of the identification waveform, however, an additional output circuit which is less heavily filtered (i.e., which is provided with a shorter time constant) is associated with the phase detector 13. This additional output circuit includes auxiliary load resistors 17 and 19 bridged between the output electrodes of the detector diodes, and a capacitor 21 coupling the junction of the auxiliary load resistors to the base input of an impedance transforming emitter follower stage 23. The resistance and capacitance values of these components are chosen to provide sufficient integration of the FIG. 1A pulse so that the emitter follower output is of the approximate square wave form shown in FIG. 1B.

Figure 3:
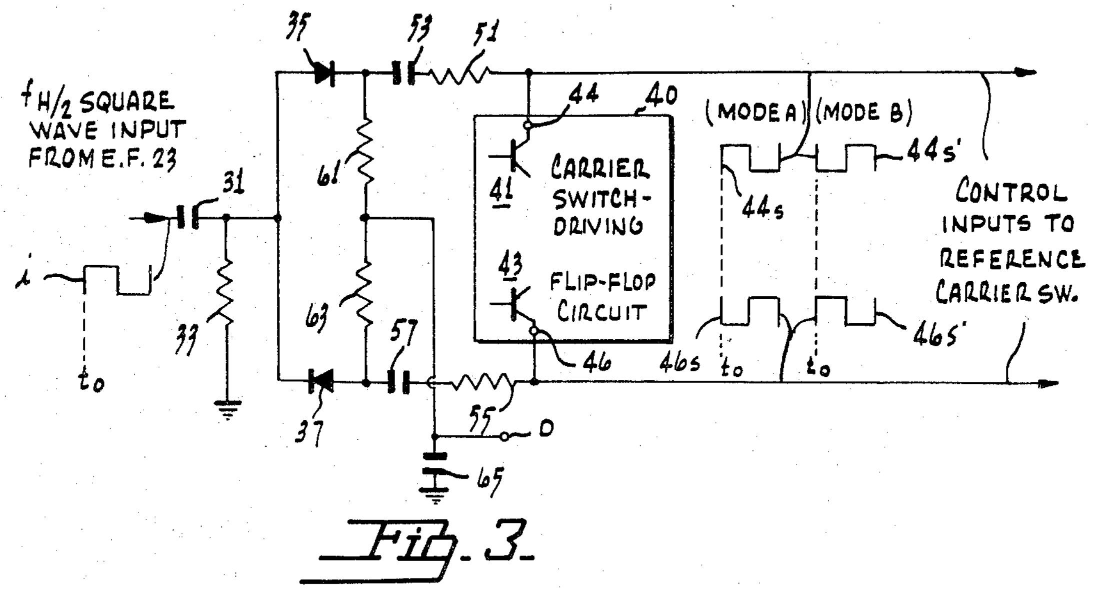
FIG. 3 illustrates, in a combined block and schematic representation apparatus for deriving control information from the square wave output of the FIG. 2 apparatus in accordance with an aspect of the present invention.

While, as noted previously, the prior art approaches have endeavored to process, in one way or another, the FIG. 1B waveform for use as a half line frequency correcting trigger, the present invention finds a more advantageous use for the control information of the FIG. 1B waveform. As illustrated in FIG. 3, the FIG. 1B square wave output of emitter follower 23 is fed to one side of a phase detector, while the push-pull output of the receiver's carrier switch driving flip-flop circuit 40 is fed to the other side.

The phase detector FIG. 3 employs a pair of diodes 35 and 37. The cathode of diode 37 and the anode of diode 35 are tied directly together, and the output of emitter follower 23 is coupled to the diode junction via a capacitor 31. A resistor 33 provides a DC return from the diode junction to a point of reference potential (e.g., chassis ground).

The details of flip-flop circuit 40 are not shown in FIG. 3, other than a representation of transistors 41 and 43 as the active devices thereof, with the respective transistor collector electrodes shown as directly linked to the respective flip-flop circuit output terminals 44 and 46. The output at terminal 44 comprising a half line frequency square wave is coupled via a resistor 51 in series with a capacitor 53 to the cathode of detector diode 35. The oppositely phased half line frequency square wave output at terminal 46 is coupled via a resistor 55 in series with a capacitor 53 to the anode of diode 37. Resistors 51 and 55 serve an isolating function, precluding noise from the burst responsive signal input from entering the flip-flop circuit 40 via the capacitors 53 and 57. The cathode of diode 35 is connected to the anode of diode 37 by a pair of resistors 61 and 63 in series. A filter capacitor 65 is coupled between the junction of resistors 61 and 63 and the point of reference potential.

Waveform $i$ illustrates a cycle of the square wave input from emitter follower 23. As illustrated, beginning at a time $t_o$, the emitter follower output is in a positive half cycle during the first line interval following $t_o$ and in a negative half cycle during the next succeeding line interval. Waveforms 44$s$ and 46$s$ illustrate corresponding cycles of the outputs of flip-flop circuit 40, assuming a first mode of operation (mode A). In mode A, the output at terminal 44 is in phase with the input wave $i$, with a positive half cycle occurring during the first line interval succeeding $t_o$, whereas the output at terminal 46 is 180° out of phase with the input wave $i$ (i.e., with a negative half cycle occurring during the line interval succeeding $t_o$).

Under the circumstances of mode A operation, the lower diode 37 will experience a larger voltage swing than will be experienced by the upper diode 35; thus, the output at terminal D will be a DC voltage of negative polarity.

If, on the other hand, the flip-flop circuit 40 is operating in the opposite mode (mode B) illustrated by wave forms 44$s'$ and 46$s$°, the larger voltage swing will be associated with diode 35, and the output at terminal D will be a positive DC value. 46s'

Examples of typical voltage levels for operation of the FIG. 3 circuit would be 10 volts (peak-to-peak) of input from emitter follower 23, and 20 volts (peak-to-peak) of square wave output from flip-flop circuit 40. For these levels, the DC voltage output at terminal D would be typically 5 volts, with the polarity depending on the flip-flop circuit operating mode. Noise on the square wave input will cause the DC output to fluctuate about the 5v. level statistically equally, so that an infinite time constant in the DC output circuit would produce a constant output of 5v. However, with the time constant shown of approximately 10,000 MSec. the DC output fluctuation is only about 1circuit for a signal which is too noisy to be usable. This follows since the square wave period is only 128 MSec. or about one-eightieth of the time constant in the DC output path.

Figure 6:
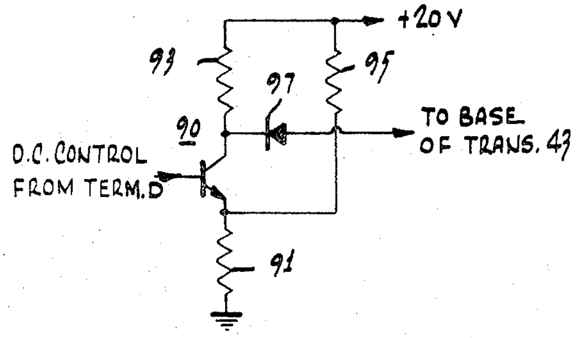

With the FIG. 3 circuitry providing a reliable DC voltage indication of the receiver's switching mode, the next aspect of the present invention is the use of this voltage to correct the switching mode when necessary. Several distinct approaches to this second aspect of the invention are illustrated in FIGS. 4, 5 and 6.

Figures 4, 5:
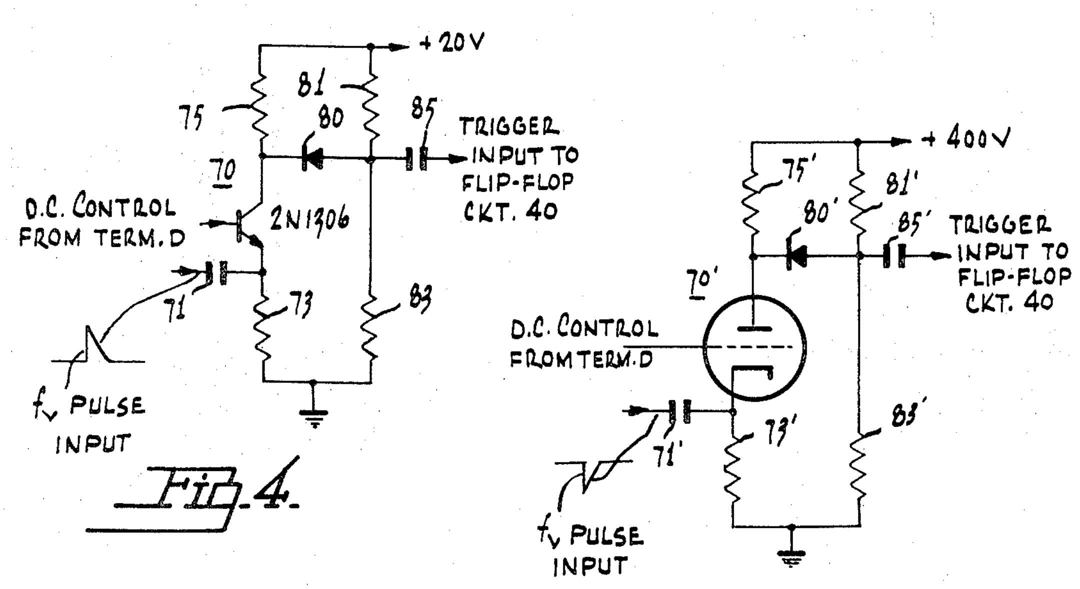
FIGS. 4, 5 and 6 illustrate schematically respectively different circuit arrangements for using the control information input of the FIG. 3 apparatus to establish a correct switching mode.

In FIG. 4, the DC control output of the phase detector of FIG. 3 is coupled to the base of a transistor 70. A positive going pulse from some convenient point in the vertical scan generator is fed via a capacitor 71 to the emitter of a transistor 70 and developed across an emitter resistor 73. If transistor 70 is in the conducting state a positive pulse (illustratively; of about 10v. PP) will be developed across the collector resistor 75.

A diode 80 connects the collector of transistor 70 to a coupling path (comprising a capacitor 85) for applying a correcting trigger input to the flip-flop circuit 40. The cathode of diode 80 is directly connected to the collector of transistor 70. A pair of resistors 81 and 83 are connected in series between a B+ terminal and chassis ground, forming a bias voltage divider, with the anode of diode 80 connected to their junction.

When the DC control voltage at the base of transistor 70 is of a positive value, corresponding to the wrong switching mode, the transistor 70 conducts and the diode is forward biased (illustratively, by 10v). Hence a (10v.) vertical frequency pulse may pass via diode 80 and capacitor 85 to the flip-flop circuit 40 to trigger it into the correct mode. When the correct mode has been reached, the DC control voltage goes to a negative value, the transistor 70 ceases to conduct, and the diode 80 is back biased (by 10v.) so that no signal at all, even if noise is present in the DC control voltage, can pass to the flip-flop circuit 40. Noise can be passed to the flip-flop circuit in the incorrect mode, but of course this is immaterial.

FIG. 5 shows a tube version of the FIG. 4 circuit using exactly the same principles but with the bias arranged to use a negative going vertical pulse. Of course, the transistor version could be made to work also for a negative vertical pulse by using a PNP transistor and a negative supply, with the diode reversed. In the tube version of FIG. 5, a triode 70′ replaces the transistor 70 of FIG. 4. The remaining elements of the FIG. 4 circuit are duplicated in the FIG. 5 arrangement, with altered values where appropriate to tube operation, and are designated in the drawing with primed versions of the FIG. 4 reference numerals. Operation is analogous to that described for FIG. 4, with an incorrect mode indicating value for the DC control voltage permitting conduction in the tube 70′, the forward biasing of diode 80′, and the resultant passage of the correcting trigger pulse via capacitor 85′ to the flip-flop circuit 40.

The circuits of FIGS. 4 and 5 utilize the combined functions of DC amplification and gating to definitely ensure that the whole identification and switching mode control circuit is isolated from the flip-flop circuit 40 when the latter is in the correct mode, even when severe noise is present. In conventional circuits, this is not usually the case, and even moderate noise can cause occasional annoying changes in the flip-flop circuit mode.

Another approach to control voltage use which retains the isolation advantage discussed above, but which does not require the pulsing employed in FIGS. 4 and 5, is shown in FIG. 6. Here, the DC control voltage from terminal D of the FIG. 3 circuit is applied to the base of transistor 90, having its emitter returned to chassis ground via an emitter resistor 91. The collector of transistor 90 is connected to a B+ source via a collector resistor 93. A biasing resistor 95 is connected between the B+ source and the emitter of transistor 90. The emitter biasing is such that the base-emitter junction of transistor 90 is back biased to ensure that the transistor will not conduct when the DC control voltage is of a zero value (a value which will occur in the absence of input to the detector from the flip-flop circuit 40). The cathode of a diode 97 is directly connected to the collector of transistor 90, while its anode is directly connected to the base of one of the transistors e.g. transistor 43 of the flip-flop circuit 40.

When the flip-flop circuit 40 is operating in the correct mode, the DC control voltage applied to the base of transistor 90 is of a negative value, with the result that the transistor 90 is nonconducting, and the diode 97 is back biased. Hence, no load is placed on the base of the flip-flop circuit transistor 43 and the flip-flop circuit 40 operates normally. However, if the flip-flop circuit mode is incorrect, the DC control voltage applied to the base of transistor 90 is of a positive value, resulting in conduction of transistor 90. In this case, the diode 97 is rendered conducting, loading down the base of transistor 43 and preventing the flip-flop circuit from operating. However, this means that the push-pull drive to the phase detector of FIG. 3 vanishes, whereupon the control voltage drops to zero, turning off transistor 90. Diode 97 is then back biased, and the load is removed from the flip-flop transistor base, permitting the flip-flop circuit to restart. If the flip-flop circuit 40 restarts in the correct mode, the DC control voltage at the base of transistor 90 will continue to hold transistor 90 off, and normal operation of the flip-flop circuit 40 will be permitted to continue undisturbed. However, if the flip-flop circuit 40 restarts in the wrong mode, the detector output will once again render transistor 90 and diode 97 conducting to again disable the flip-flop circuit. Disabling and restart will continue in sequence until restart in the correct mode is attained. In practice, this process takes at the most only a few milliseconds and is virtually not noticeable to the viewer (i.e., appears to be instantaneous).

Figure 7:
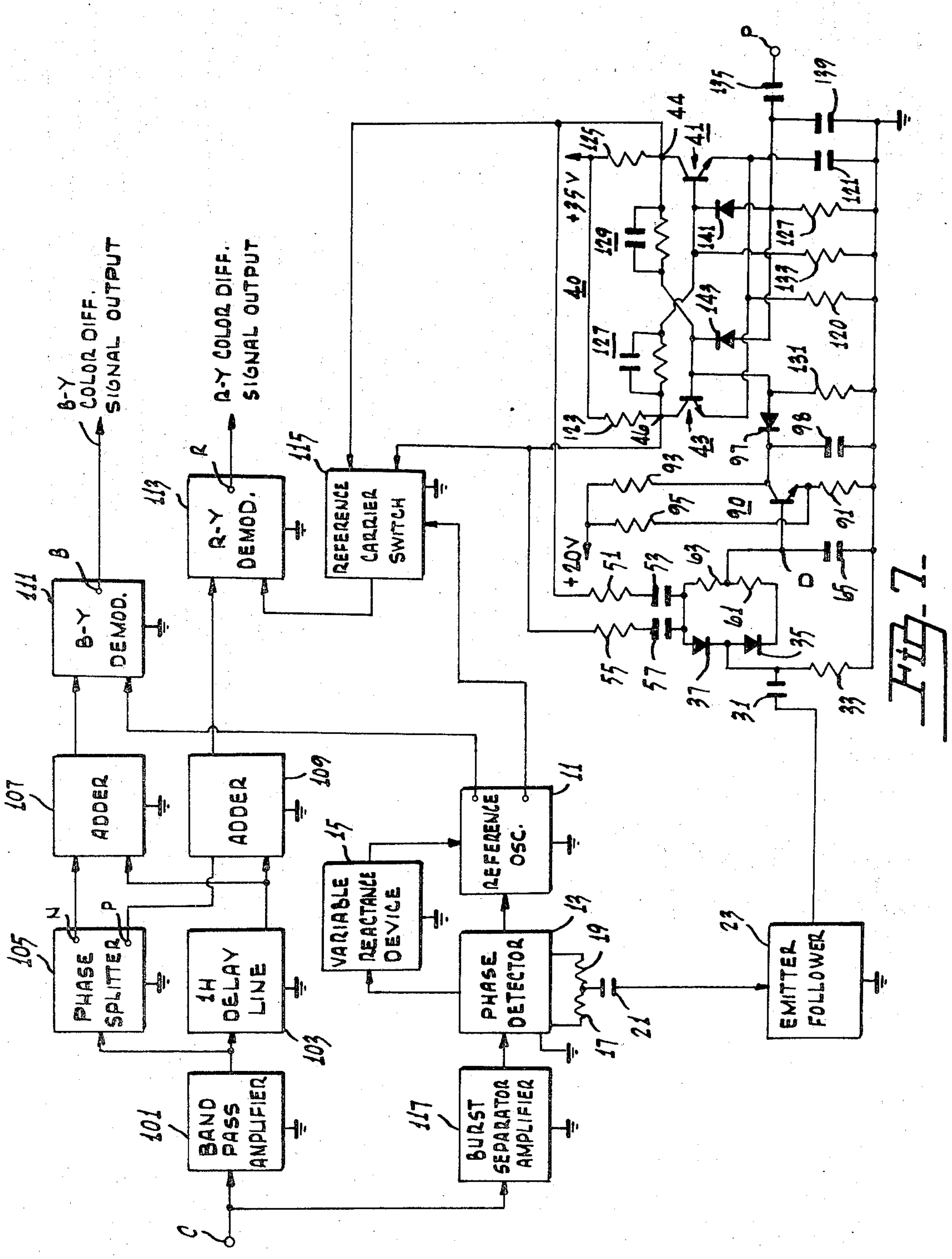
FIG. 7 illustrates, in a combined block and schematic representation, an arrangement of a portion of a color television receiver in accordance with a particular embodiment of the present invention, combining the techniques illustrated in FIGS. 2, 3 and 6.

In FIG. 7, apparatus of the type shown in FIGS. 2, 3 and 6 have been shown together in a working combination, in the setting of a representative PAL color receiver arrangement. In the receiver portion shown in FIG. 7, the chrominance signal component of a received PAL signal, appears at a chrominance input circuit C, and is supplied to a band-pass amplifier 101. The output of amplifier 101 is applied to a delay line 103, providing a signal delay of duration equal to one line interval (lH), as well as to a phase splitter 105 (illustratively, comprising a transformer), providing both a phase inverted output at terminal P and a noninverted output at terminal N.

The delayed signal output of delay line 103 is combined with the phase inverted, undelayed signal from terminal P in an adder 109, and is additionally combined with the noninverted, undelayed signal from terminal N in a second adder 107. The output of adder 109 comprises the R-Y component of the received chrominance signal; this follows because the R-Y component (which is reversed in phase line to line) in its delayed form is reenforced by the phase inverted signal of the succeeding line, while the B-Y component (not subject to the line by line alternation) in its delayed form is effectively canceled by the phase inverted signal of the succeeding line. Conversely, the output of adder 107 comprises the B-Y component of the received chrominance signal (the delayed R-Y component being effectively canceled by the altered phase R-Y component of the succeeding line).

The output of adder 107 is applied to the B-Y demodulator 111, which also receives a suitably phased output of the reference oscillator 11 and effects synchronous detection of the B-Y component of the received chrominance signal to develop a B-Y colour difference signal output at its output terminal B. Synchronous detection of the R-Y component output of adder 109 is effected by a R-Y demodulator 113. However, in view of the line to line phase alternation of the R-Y component, the demodulator 113 does not directly receive an output of the oscillator 11, but rather responds to the output of the reference carrier switch 115, to which a suitably phased output of oscillator 11 is applied. The reference carrier switch 119 alternates, line by line, delivering a phase inverted and a noninverted version of its input from oscillator 11; the alternation is carried on in response to push-pull switch wave forms from the flip-flop circuit 40, to be subsequently described in greater detail.

The chrominance signal component input at the terminal C is also supplied to a burst separator amplifier 117, which is suitably gated to separate the color synchronizing burst component of the received signal for delivery to phase detector 13. Detector 13, which may take the form shown in FIG. 2, compares the phase of the separated burst component with an output of oscillator 11 to develop a control voltage for the variable reactance devices 15 for suitable phase locking of oscillator 11. As in FIG. 2, the phase detector 13 is provided with an auxiliary output circuit including resistors 17 and 19, capacitor 21 and the impedance-transforming emitter follower stage 23. As in FIG. 2, such apparatus develops the half line frequency identification waveform of FIG. 1B from the received bursts.

The identification waveform is supplied via capacitor 31 to phase detector apparatus directly corresponding to that shown in FIG. 3. As described in connection with FIG. 3, this detector compares the phase of the identification waveform with the switch-driving outputs of the flip-flop circuit 40 to develop a DC control voltage output indicative of the mode of operation of the flip-flop circuit 40 at terminal D. This control voltage is utilized by transistor 90 disposed in a configuration of the type shown in FIG. 6.

Thus, the emitter of transistor 90 is connected to chassis ground via an emitter resistor 91, and biasing of the emitter is controlled by the connection of a biasing resistor 95 between a point of B+ potential an the emitter. The collector of transistor 90 is connected to the B+ source via the collector resistor 93. A relatively large valued (e.g., 1 microfarad) capacitor 98 is connected between the collector of transistor 90 and chassis ground. As in FIG. 6, diode 97 has it's cathode connected to the collector of transistor 90 and its anode connected to the base of transistor 43 of the flip-flop circuit 40.

The schematic details of a representative form which the flip-flop circuit 40 may take are also shown in FIG. 7. In the illustrated configuration, the flip-flop transistors 41 and 43 have their emitters sharing a common connection to chassis ground via an emitter resistor 120 shunted by a capacitor 121. The respective bases of transistors 41 and 43 are returned to chassis ground via respective resistors 133 and 131. Respective collector resistors 123 and 125 connect the collectors of the respective transistors 43 and 41 to a B+ source. The collector of transistor 43 is linked to the base of transistor 41 by a parallel RC network 127, while the collector of transistor 41 is linked to the base of transistor 43 by a corresponding parallel RC network 129. Line rate trigger pulses from a suitable point in the receiver's horizontal deflection circuitry appear at a trigger pulse input terminal P, and are coupled via a capacitor 135 and respective steering diodes 141 and 143 to the bases of the respective transistors 41 and 43. The parallel combination of resistor 137 and capacitor 139 is connected between the junction of capacitor 135 and the steering diodes and chassis ground.

The above-described configuration of flip-flop circuit 40 is conventional in character and does not in itself constitute a portion of the present invention. The above-described elements are suitably proportioned to establish the bistable trigger operation characteristic of a flip-flop circuit, producing at the output terminals 44 and 46, the respective, oppositely phased, half line frequency square wave signals required for operating switch 115 (and illustrated in FIG. 3).

In operation, the circuitry of FIG. 7 will sense the correct mode of operation of switch 115 by developing a control voltage at terminal B of a value holding transistor 90 and diode 97 off, and allowing normal triggering of flip-flop circuit 40 by the pulses at terminal P to continue undisturbed. An incorrect mode of operation of switch 115 will be sensed by the development at terminal D of a control voltage of a value rendering transistor 90 conducting, and disabling the flip-flop circuit 40 by loading down the base of transistor 43 via the conducting diode 97. The disabling will in turn render transistor 90 nonconducting to permit restart of flip-flop circuit 40, with the disabling and restart sequentially recurring until they restart in the correct mode.

While the foregoing circuits have been described in conjunction with PAL receivers, it will be recognized that the invention principles can be applied to other forms of PAL equipment where identification and switching mode control is required: e.g., tape recorders, cameras and picture monitors. Additionally, it may be observed that the invention principles may also be advantageously employed for switching mode control for SECAM decoders. While line identification is accomplished in the signal of the SECAM system by a flagging technique differing from the aforementioned "swinging burst," an analogous opportunity exists for both deriving a DC indication of the correctness or incorrectness of demodulator terminal switching, and for using the derived DC voltage to correct, when necessary, such switching (as in the FIG. 6 arrangement), with apparatus providing isolation when switching is in the correct mode.

The table below sets forth, by way of example only, parameter values for elements of the illustrated circuits which have provided satisfactory operation.

Resistors 17, 19—330,000 ohms (each).
Resistor 33—10,000 ohms.
Resistors 51, 55—10,000 ohms (each).
Resistors 61, 63—22,000 ohms (each).
Resistors 73, 73′, 91—220 ohms (each).
Resistors 75, 93—10,000 ohms.
Resistor 75′—68,000 ohms.
Resistors 81, 83—22,000 ohms.
Resistor 81′—100,000 ohms.
Resistor 83′—33,000 ohms.
Resistor 95—15,000 ohms.
Capacitor 21—1 microfarad.
Capacitor 31—.1 microfarad.
Capacitors 53, 57—.05 microfarad (each).
Capacitor 65—.5 microfarad.
Capacitor 71—.01 microfarad.
Capacitor 71′—.1 microfarad.
Capacitors 85, 85′—4700 micromicrofarads (each).
Capacitor 98—.1 microfarad.
Diodes 35, 37, 97—Type OA85.
Transistor 90—Type BC108.

I claim:

1. In a color television receiver including a plurality of color demodulators, and apparatus, associated with the utilization of at least one of said demodulators, subject to switching, line by line, between first and second operating conditions, and wherein proper operation of said color television receiver requires that said line by line switching of said apparatus occur in a sense matching a predetermined sense of line by line alteration of signals received by said color television receiver, a switching control system comprising the combination of:
means for deriving from said received signals a half line frequency waveform indicative of the sense of said line by line signal alteration;
bistable flip-flop circuit means providing, in response to line frequency triggering pulses, half line frequency switching waves for controlling the line by line switching of said apparatus between said first and second operating conditions;
a phase detector responsive to said derived half line frequency waveform and to said half line frequency switching waves for developing a control voltage of a first value when the sense of said switching correctly matches the sense of said signal alteration and of a value differing from said first value in the absence of said correct matching of senses; and
means responsive to the control voltage developed by said phase detector for altering the operation of said flip-flop circuit means, said altering means being rendered inoperative whenever the control voltage developed by said detector is of said first value.

2. A switching control system in accordance with claim 1 wherein said operation altering means comprises means for disabling said flip-flop circuit means whenever said control voltage value significantly differs from said first value.

3. In a color television receiver including a plurality of color demodulators, and apparatus, associated with the utilization of at least one of said demodulators, subject to switching, line by line, between first and second operating conditions, and wherein proper operation of said color television receiver requires that said line by line switching of said apparatus occur in a sense matching a predetermined sense of line by line alteration of signals received by said color television receiver, a switching control system comprising the combination of:
bistable flip-flop circuit means providing, in response to a line frequency triggering pulse input, half line frequency switching waves for controlling the line by line switching of said apparatus between said first and second operating conditions;
means responsive to said received signals and to said half line frequency switching waves for developing a control voltage of a first value when the sense of said switching correctly matches the sense of said signal alteration and of values differing from said first value in the absence of said correct matching of senses; and
means responsive to the control voltage output of said developing means for altering the operation of said flip-flop circuit means, said altering means being rendered inoperative whenever the control voltage developed by said detector is of said first value.

4. In a color television receiver including deflection circuitry providing a source of line frequency triggering impulses, a plurality of color demodulators, a reference color oscillator, switching apparatus coupled to said oscillator for switching the reference oscillation input to one of said demodulators, line by line, between first and second mutually opposite phase conditions, and wherein proper operation of said color television receiver requires that said line by line color occur in a sense matching a predetermined sense of line by line alteration of signals received by said colour television receiver, a switching control system comprising the combination of:

- a color oscillator synchronizing circuit including means for deriving from said received signals a half line frequency waveform indicative of the sense of said line by line signal alteration;
- bistable flip-flop circuit means providing, in response to line frequency triggering impulses from said source, half line frequency switching waves for controlling the line by line switching of reference oscillation input between said first and second mutually opposite phase conditions;
- a phase detector responsive to said derived half line frequency waveform and to said half line frequency switching waves for developing a control voltage of a first value when the sense of said switching correctly matches the sense of said signal alteration and of values differing from said first value in the absence of said correct matching of senses; and
- means responsive to the control voltage developed by said phase detector for altering the operation of said flip-flop circuit means, said altering means being rendered inoperative whenever the control voltage developed by said detector is of said first value.

5. A switching control system in accordance with claim 4, wherein said operation altering means includes a diode normally biased for nonconduction, control means responsive to said control voltage developed by said detector for rendering said diode conducting when said detector develops a control voltage of values differing significantly from said first value, and means coupling said diode to said flip-flop circuit means in such manner that conduction of said diode serves to disable said flip-flop circuit means.

6. A switching control system in accordance with claim 4 wherein said deflection circuitry also provides a source of field frequency triggering impulses, a gate coupled between said source of field frequency triggering impulses and said flip-flop circuit means, and control means responsive to said control voltage developed by said detector for causing said gate to block passage of said field frequency triggering impulses when said detector develops a control voltage of said first value indicating presence of correct matching of said senses and for causing said gate to permit passage of a field frequency triggering impulse to reset said flip-flop circuit means develops a control voltage of said differing value.

7. Apparatus in accordance with claim 3 wherein said altering means comprises means for precluding said bistable flip-flop means from responding to said line frequency triggering impulses.

8. Apparatus in accordance with claim 3 wherein said altering means comprises an additional source of resetting pulses for said bistable flip-flop circuit means, and means for applying said resetting pulses to said bistable flip-flop circuit means, said resetting pulse applying means being rendered inoperative whenever the control voltage developed by said detector is of said first value.